United States Patent

[11] 3,583,646

| [72] | Inventor | Thomas M. Bogenschutz |
| | | Clayton, N.Y. |
| [21] | Appl. No. | 815,039 |
| [22] | Filed | Apr. 10, 1969 |
| [45] | Patented | June 8, 1971 |
| [73] | Assignee | Frink Sno-Plows, Inc. |
| | | Clayton, N.Y. |

[54] HIGHWAY SPREADER
3 Claims, 9 Drawing Figs.

[52] U.S. Cl. .................................................. 239/666,
239/672, 239/687
[51] Int. Cl. ............................................... E01c 19/20
[50] Field of Search ........................................... 239/650,
656, 668, 672, 673, 681, 682, 684, 687, 671, 674,
676, 689, 665, 666; 214/83.36

[56] References Cited
UNITED STATES PATENTS

| 648,152 | 4/1900 | Loessner | 239/671 |
| 1,258,377 | 3/1918 | Stuart | 214/83.36 |
| 1,285,183 | 11/1918 | Holden | 239/673 |
| 2,856,191 | 10/1958 | Kolb | 239/665X |
| 2,954,982 | 10/1960 | Saiberlich | 239/665 |
| 3,158,375 | 11/1964 | Vig | 239/665X |
| 3,187,910 | 6/1965 | Decker et al. | 214/83.36 |
| 3,377,030 | 4/1968 | Swenson | 239/656 |

*Primary Examiner*—M. Henson Wood, Jr.
*Assistant Examiner*—Edwin D. Grant
*Attorney*—D. Emmett Thompson ABSTRACT: The spreader hopper is formed with a lengthwise extending trough in the bottom wall. A spreader module is attached to an end wall of the hopper in registration with one end of the trough. The module includes sprockets over which a conveyor chain is trained. An idler sprocket module is attached to the opposite end wall. One sprocket in the spreader module is power driven to move the lower run of a conveyor chain toward the spreader module, the upper run of the chain extends through an enclosed passageway extending between the end walls above the trough. The modules are interchangeable to provide spreading from either the front or rear end of the hopper. Preferably, the hopper is formed with two troughs with the bottom wall of the hopper of W-formation in cross section to lower the center of gravity of the apparatus.

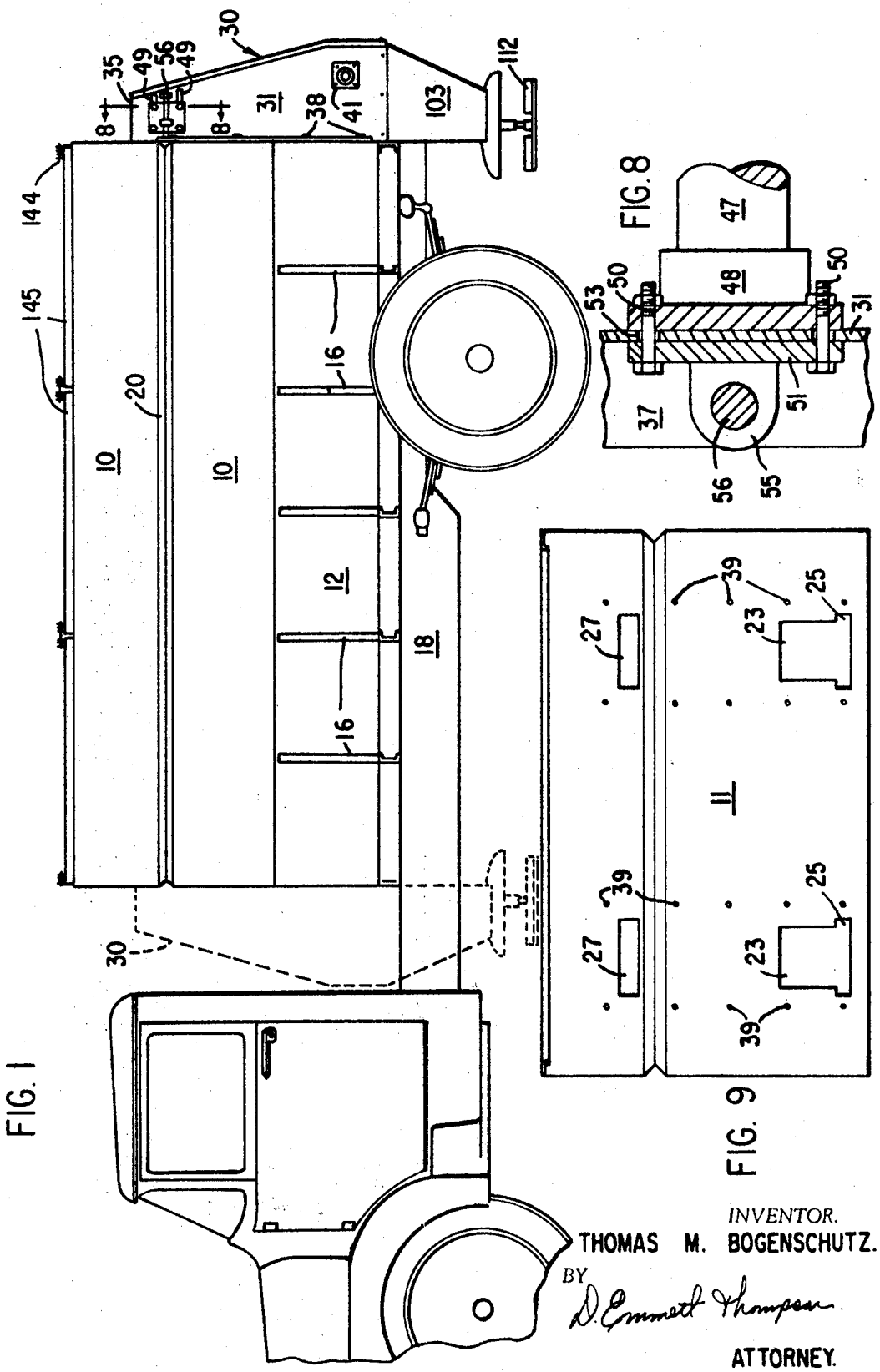

*INVENTOR.*
THOMAS M. BOGENSCHUTZ.
BY
D. Emmett Thompson
ATTORNEY.

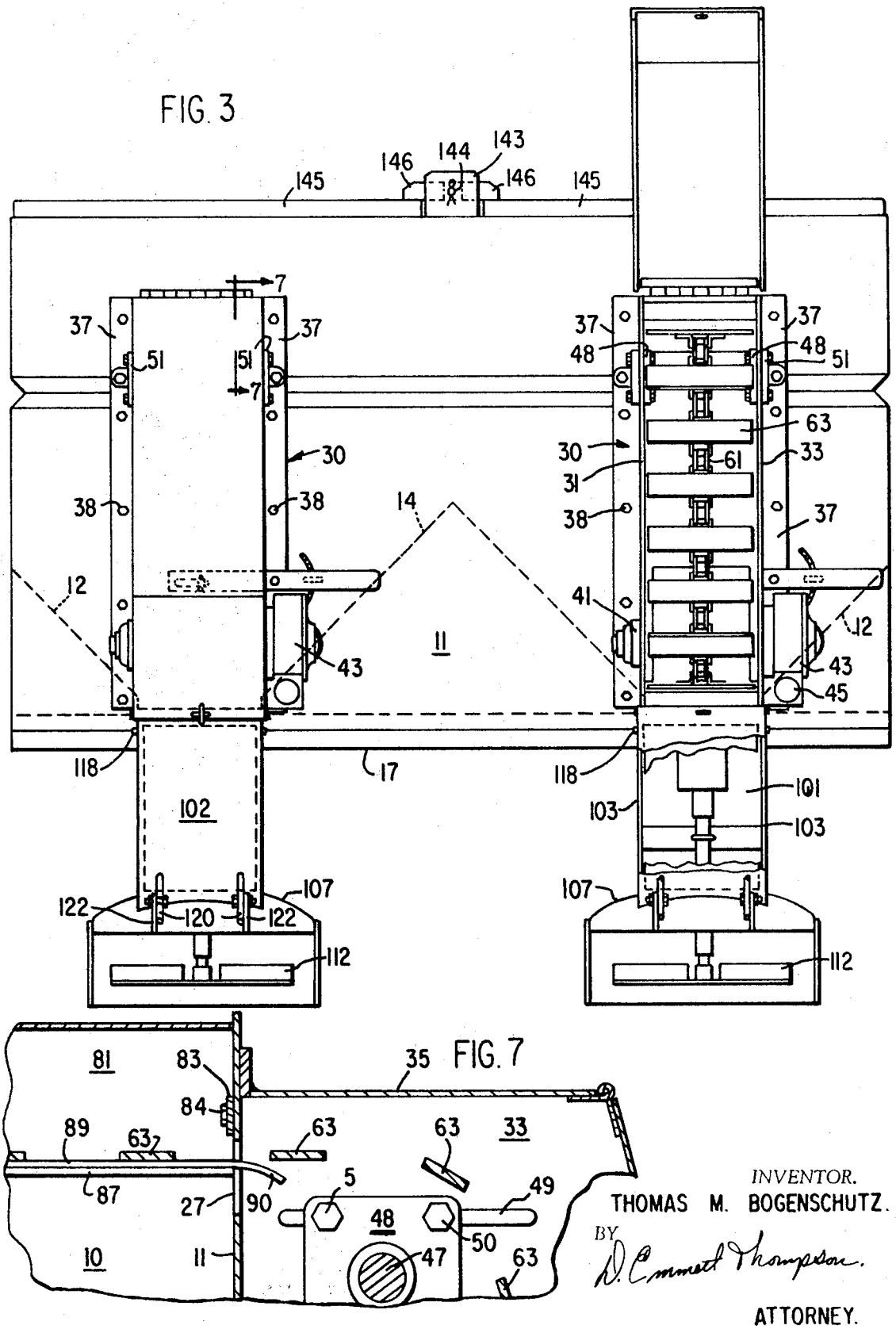

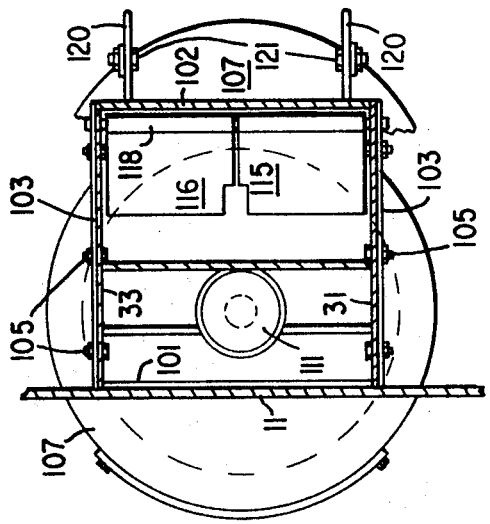
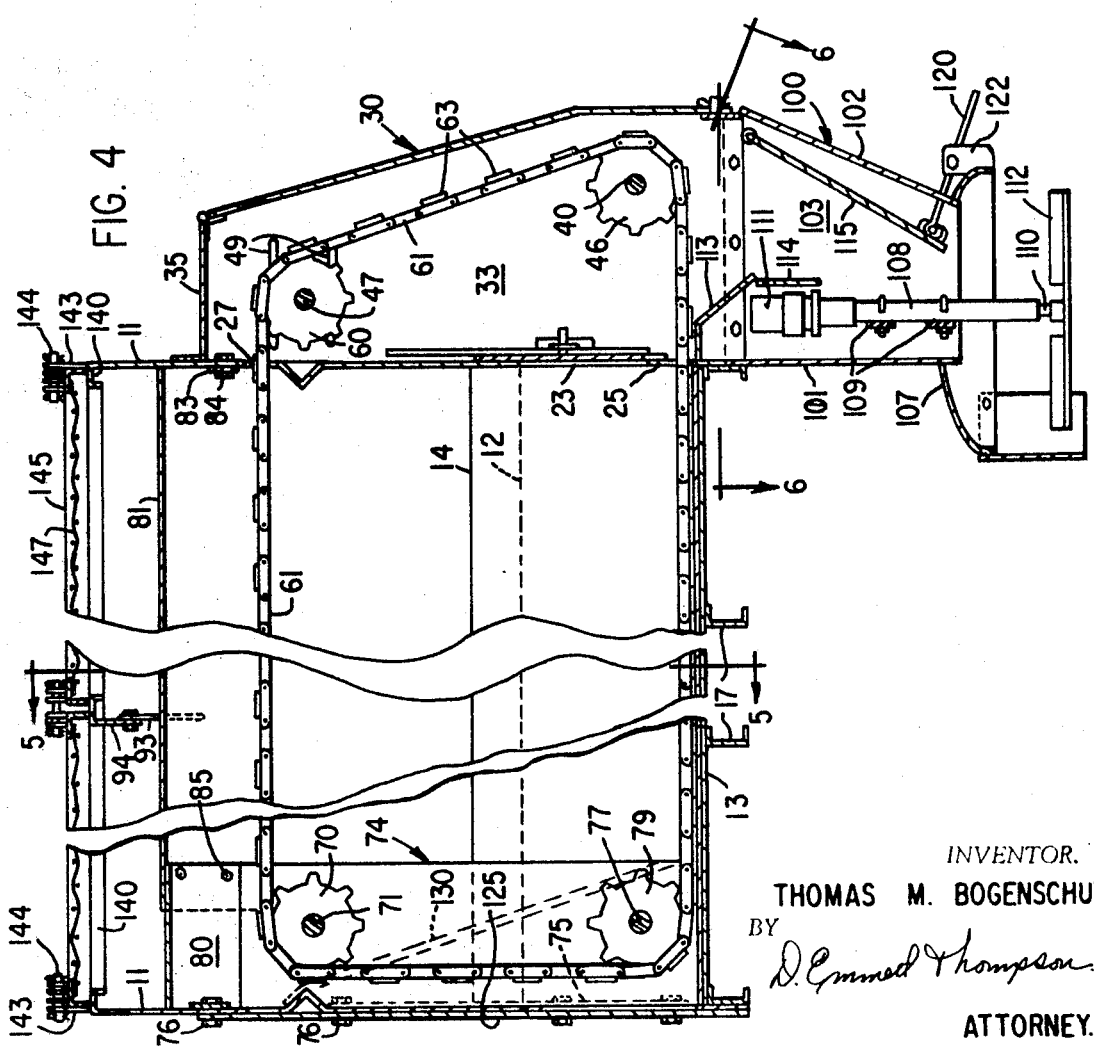

HIGHWAY SPREADER

BACKGROUND OF THE INVENTION

This invention has to do with apparatus of the type mounted on a motor truck for spreading granular material on the highway. It is conventional in such apparatus to provide a screw conveyor for moving the material from the hopper to the spreader. Also, chain conveyors are employed with the upper run of the chain moving along the bottom wall of the hopper, and the lower return run of the chain extending below the hopper. The screw conveyor arrangement is costly to build and, on occasion, becomes clogged. The type of chain conveyor referred to results in the bottom wall of the hopper having to be elevated a greater distance above the truck frame in order to provide for the return run of the chain. Usually, the return run of the chain extends through a chute and because of the arrangement, granular material is dragged into the chute, causing the conveyor to become clogged. In both instances, the conveyors are not associated with the spreaders in the sense of forming a part thereof, or vice versa.

BRIEF SUMMARY OF THE INVENTION

The spreader embodying my invention includes a hopper formed with like end walls. A spreader module is detachably affixed to one end wall and includes a pair of sprockets, one of which is power driven. An idler sprocket module is affixed to the opposite end wall of the hopper. An endless conveyor chain is trained over the sprockets in both modules with the lower run of the chain moving along a trough formed in the bottom wall of the hopper. The upper run of the chain runs through an enclosure extending between the end walls of the hopper. Due to the fact that the end walls are of like formation, and the modules are provided with like mounting arrangements, the modules are interchangeable whereby the spreader module may be mounted on either the front or rear end wall of the hopper. There are preferably a pair of troughs with the modules mounted at the ends of the trough.

BRIEF DESCRIPTION OF DRAWINGS

FIG. 1 is a side elevational view of a spreader apparatus embodying my invention.
FIG. 3 is a rear elevational view.
FIG. 4 is a view taken on line 4-4, FIG. 2.
FIG. 6 is a view taken on line 6-6, FIG. 4.
FIG. 7 is an enlarged view taken on line 7-7, FIG. 3.
FIG. 8 is an enlarged view taken on line 8-8, FIG. 1.
FIG. 9 is an elevational view of an end wall of the hopper.

DETAILED DESCRIPTION

The spreader apparatus includes a large hopper capable of holding ten or more cubic yards of granular material, such as sand. The hopper is formed with sidewalls 10 and end walls 11. The side walls are of like dimension and form. Also, the end walls are of like dimension and form, one of which is shown in elevation in FIG. 9. The side and end walls are welded together to form an integral structure.

Figure 5:
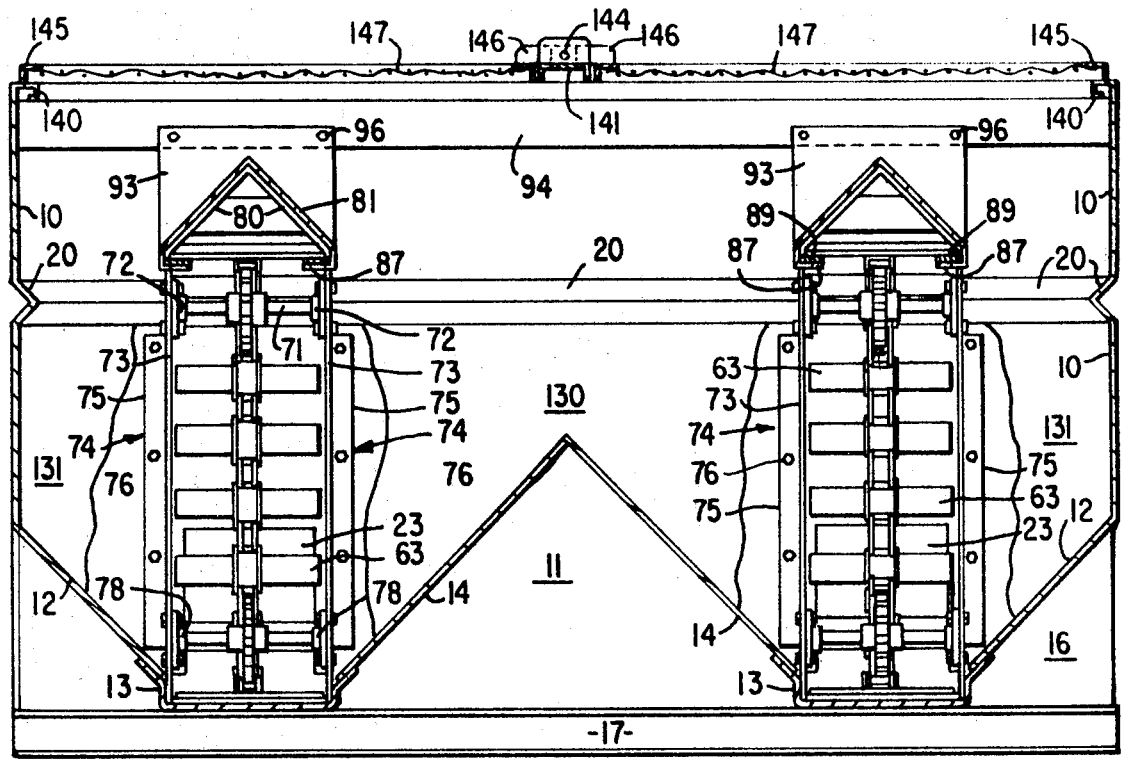
FIG. 5 is a view taken on line 5-5, FIG. 4.
Figure 2:
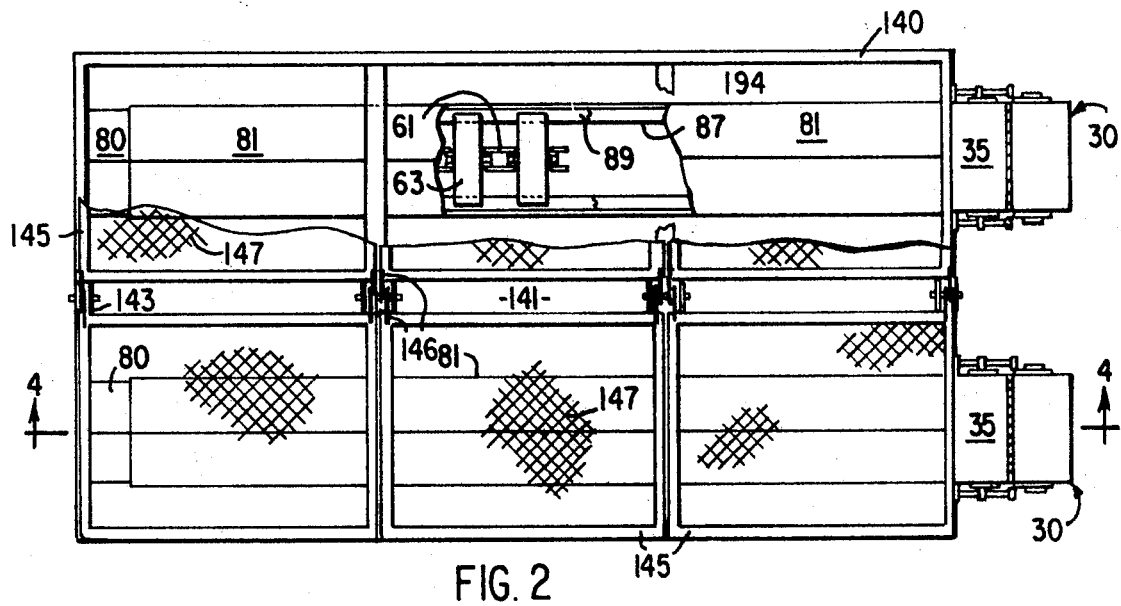
FIG. 2 is a top plan view.

The lower portions of the sidewalls 10 are included inwardly and downwardly, as at 12, see FIG. 5. The lower edge portions of the inclined areas 12 are fixedly secured, as by welding, to the outer side edges of troughs 13. In the form illustrated, there are two troughs 13 which extend lengthwise of the hopper between the end walls 11. The inner sides of the troughs 13 are welded to the lower edges of an inverted V-shaped member 14. With this arrangement, the lower portion of the hopper is of W-shape in cross-sectional form. Reinforcing gussets 16 are welded to the inclined sidewall portions 12 and to transversely extending supporting rails 17 which, in turn, are fixedly secured to the side rails 18 of a motor truck.

The sidewalls 10 and the end walls 11 are formed with inwardly extending ridges 20 of V-formation to impart rigidity to the walls.

Each end wall is formed with a pair of lower discharge openings 23, see FIG. 9, the lower portions 25 of which are of greater width and are arranged in registration with the ends of the troughs 13. The end walls are also formed with a pair of upper return chain openings, or apertures 27, spaced upwardly from the openings 23 and arranged in vertical alignment therewith.

In the arrangement illustrated, discharge housings 30 are detachably affixed to the rear end wall 11. These housings consist of vertically disposed sidewalls 31, 33, connected at their upper ends by a top wall 35. The sideplates 31, 33, are provided with laterally extending flanges 37 formed with apertures to receive bolts 38 which extend through apertures 39, see FIG. 9, in the end wall 11. The mounting arrangement is such that each discharge housing is arranged in registration with a pair of the openings 23, 27.

A shaft 40 is journaled at one end in a bearing 41 mounted on the lower portion of the sidewall 31 of each housing 30. The opposite end of the shaft is journaled in a housing 43 fixed to the sidewall 33. The housing 43 contains a gear reduction drive driven by a variable-speed hydraulic motor 45. Fixed to the shaft 40, intermediate the ends thereof, is a sprocket 46. Shafts 47 are journaled in the upper portions of the housings 30. These shafts are journaled at their ends in bearings 48 mounted on the inner surfaces of the sidewalls 31, 33. The sidewalls are formed with elongated slots 49, through which bolts 50 extend. A plate 51 is mounted on the outer surface of each sidewall and apertured to receive the bolts 50. A spacer sleeve 53 is positioned on each bolt for sliding movement in the slots 49. A lug or ear 55 is fixed to each of the plates 51 and is formed with a threaded aperture to receive an adjusting screw 56. The ends of the adjusting screws abut against the flanges 37 of the discharge housings. A sprocket 60 is fixed to each shaft 47. The sprockets 60 are arranged in vertical alignment with the sprockets 46. A conveyor chain 61 is trained about the sprockets 46, 60. This chain is provided with plates 63 spaced therealong. The sprocket 46 is positioned so that the plates 63 move along the troughs 13. The sprocket 46 is powered by the motor 45 to move the lower run of the chain 61 rearwardly along the trough 13 to discharge the granular material through the openings 23, 25.

The upper runs of the chains 61 extend forwardly from the upper sprockets 60 through the return chain openings 27, and are trained over sprockets 70 mounted on shafts 71 journaled in bearings 72 bolted on the inner surfaces of vertically disposed side members 73 of idler sprocket housings 74, attached to the inner surface of the front end wall 11, see FIG. 4. The sides 73 of these housings are formed with laterally extending flanges 75, similar to the flanges 37 of the discharge housing, see FIG. 5. The flanges 75 are formed with apertures spaced complemental to the holes 39 in end walls 11 for reception of bolts 76. Shafts 77 are journaled in bearings 78 fastened to the side members 73. Sprockets 79 are mounted on the shafts 77. The upper runs of the chains 61 are trained over the sprockets 70 and downwardly and about the sprockets 79 to direct the crossbars 63 for movement along the troughs 13 toward the discharge openings 23, 25.

The side members 73 are formed with upwardly and inwardly extending portions 80 forming a gable roof structure. The upper runs of the chains move forwardly through an inverted V-shaped passageway, or enclosure, 81 provided at one end with a cross plate 83 which is affixed to the rear wall 11, as by bolts 84, see FIG. 4. The opposite end of the housing 81 overlaps the gable roof structure 80 of the front idler housings and is affixed thereto, as by bolts 85.

The lower edges of the passageway 81 are turned inwardly, as at 87, FIG. 5, and serve to support elongated wear strips 89, see FIGS. 5 and 7. The ends of the conveyor slats 63 slide along the wear strips 89, the rear ends of which are curved downwardly at 90, see FIG. 7. The chain links have been omitted in this FIG. in order to more clearly illustrate the wear strip structure.

Plates 93 are welded onto the chain enclosure 81 and extend upwardly therefrom. Cross supports 94, extending between the sidewalls 10, are fixed to the plates 93 by bolts 96, see FIGS. 4 and 5.

With this arrangement, rearward movement of the lower runs of the chains 61 effect discharge of the granular material through the end wall openings 23, 25. A spreader unit 100 is attached to the lower end of each discharge housing 30. This unit consists of a housing having front and rear walls 101, 102, and sidewalls 103.

The walls 101, 102, 103, are welded together. The sidewalls 103 are attached to the lower edges on the sidewalls 31, 33, of the discharge housings by bolts 105. The rear wall 103 inclines inwardly and downwardly, see FIG. 4. A circular shroud 107 is welded to the lower ends of the walls 101—103, and is formed with a central opening of rectangular form. An arbor housing 108 is fixed to a pair of crossmembers 109 welded at their ends to the side members 103. A spindle 110 is journaled in the housing 108 and is connected at its upper end to a variable speed hydraulic motor 111. A spinner disc 112 is affixed to the lower end of the arbor. A deflector plate structure is attached to the end wall 11 immediately below the opening 25. This deflector plate has a portion 113 inclined downwardly and rearwardly, and merging with a vertical portion 114.

In operation of the apparatus, the conveyor chain 61 functions to discharge the granular material from the hopper through the openings 23, 25, for descent through the spreader housing 100 for engagement by the spinner 112 for radial distribution over the road surface. The material discharged from the hopper is directed toward the axis of the spinner 112 by adjustable damper plates 115, 116. These damper plates 115, 116, are mounted at their upper ends on a shaft 118 journaled in the sidewalls 103. Adjusting rods 120 are pivotally connected to the lower portions of the plates 115, 116. These rods extend through apertures formed in clamp bolts 121 mounted in ears 122 welded to the rear portion of the shroud 107. With this arrangement, the plates 115, 116, may be individually adjusted about the axis of the shaft 118 to direct the granular material rearwardly, or forwardly, of the axis of the spinner 112 in order to obtain the desired spread pattern of the material on the highway.

The top edge portions of the side and end walls 10, 11, are bent inwardly and downwardly to form an inverted channel rim 140. A beam 141 of inverted channel formation extends from one end wall to the other, and is welded at its ends to the rims 140 on the end walls. A plurality of upwardly extending ears 143 are welded to the beam 141 at spaced intervals therealong, and are apertured to receive pins 144. Rectangular frames 145 are provided with hinge lugs 146 hingedly connected to the ears 143 by pins 144. The screen frames 145 are provided with wire mesh 147. These screens serve to sift the granular material while it is being loaded into the hopper.

It is to be noted that the discharge housings 30 and the idler chain sprocket housings 74 are in the form of modules adapted for attachment to either the front or rear end walls 11 of the hopper. A discharge housing 30 is indicated in dotted outline in FIG. 1, as attached to the front end wall 11, in which event the corresponding idler chain housing 74 would be attached to the rear end wall 11.

A cover plate 125, see FIG. 4, is employed with each idler chain housing to effectively close the openings 23, 25, 27, in the end wall to which the idler chain housing is mounted. A plate 130, formed with a V-notch complemental to the member 14, is attached to the endwall 11 and extends between the idler chain housing 74 and the sidewall 10. This plate is inclined downwardly and rearwardly, as shown in dotted line, FIG. 4. There is also a deflector plate 131 mounted intermediate each idler chain housing and the sidewall 10. These plates also incline downwardly and rearwardly and have their lower edges welded to the inclined portions 12 of the sidewalls. The inner side edge margins of these plates 131 are broken away to better illustrate the flanges 75 of the idler chain housings and in like manner, the side edges of the plate 130 are broken away.

Heretofore, the granular material has been discharged from the hopper to the spreader units by means of power-operated screw conveyors, or by chain conveyors, the upper runs of which extend along the bottom floor of the hopper, and the lower runs pass underneath the hopper structure. The screw conveyor arrangements are costly to construct and have a tendency to become clogged. The chain arrangement referred to necessitates the bottom of the hopper being elevated above the crossmembers which support the hopper on the truck frame in order to provide an area for the return run of the chain. With the structure of my invention, wherein the upper runs of the chains are directed through the chain enclosures 81, in combination with the W-form of hopper bottom structure, the center of gravity of the loaded hopper is substantially lower than the spreader apparatus now in use. This is important especially in the larger sizes wherein the hoppers contain some 10 to 15 cubic yards of material.

What I claim is:

1. Apparatus for spreading granular material on the surface of highways comprising a hopper adapted to be mounted on a motor truck for containing a supply of granular material, said hopper having sidewalls, end walls and a bottom wall, said bottom wall being formed with two troughs extending lengthwise of the hopper in parallel spaced relation, the areas of said bottom wall adjacent the sides of said troughs inclining downwardly toward said troughs, an enclosed passageway disposed in upwardly spaced relation relative to each of said troughs and extending lengthwise of the hopper between the end walls thereof, one of said end walls being formed with discharge openings arranged in registration with like ends of said troughs, said one end wall being also formed with a return chain opening located above each of said discharge openings, a spreader unit housing affixed to one said end wall in registration with each of said discharge openings, a driving sprocket and an idler sprocket journaled in each of said housings, a pair of free running sprockets journaled at the opposite ends of each of said troughs, a conveyor chain having a lower run arranged in each of said troughs and trained over said sprockets at the ends of the trough, power means connected to each of said driving sprockets and operable to move the lower runs of said conveyor chains along said troughs toward said discharge openings, and a power operated spreader arranged in juxtaposition to each of said discharge openings for receiving material therefrom.

2. Apparatus for spreading granular material on the surface of highways comprising a hopper adapted to be mounted on a motor truck for containing a supply of granular material, said hopper having sidewalls, end walls and a bottom wall, one of said end walls being formed with a discharge opening, a conveyor operable to move granular material from said hopper through said opening, a vertically disposed spreader unit housing affixed to said end wall in registration with said discharge opening, a spreader spinner journaled in said housing for rotation about a vertical axis, power means for effecting rotation of said spinner, a pair of material deflecting plates mounted in said housing above said spinner and extending upwardly therefrom, said plates being pivotally attached at their upper ends to said housing and adjusting means operable exteriorly of the housing for adjusting the lower ends of said plates in a direction fore and aft of the axis of said spinner.

3. Apparatus for spreading granular material on the surface of highways comprising a hopper adapted to be mounted on a motor truck for containing a supply of granular material, said hopper having sidewalls, end walls, and a bottom wall, said bottom wall being formed with two troughs extending lengthwise of the hopper in parallel spaced relation, an enclosed passageway disposed in upwardly spaced relation relative to each of said troughs and extending lengthwise of the hopper between the end walls thereof, said hopper end walls being formed with discharge openings arranged in registration with the ends of said troughs, closures detachably fixed to one of said end walls closing said discharge openings in said end wall, a discharge housing affixed to the opposite end wall of said hopper in registration with each discharge opening therein, a driving sprocket and an idler sprocket journaled in each of said discharge housings, a pair of freerunning sprockets journaled in said hopper in proximity to the opposite end wall thereof, a conveyor chain having a lower run arranged in each of said troughs and trained over said sprockets at the ends of the troughs, a power means mounted on each of said discharge housings and being operatively connected to said driving sprockets journaled therein and operable to move the lower runs of said conveyor chains along said troughs toward said discharge openings, and a power-operated spreader arranged below and in juxtaposition to each of said discharge housings for receiving material therefrom.